United States Patent [19]
Takahashi et al.

[11] Patent Number: 4,652,540
[45] Date of Patent: Mar. 24, 1987

[54] CATALYST FOR OLEFIN POLYMERIZATION AND PROCESS FOR PRODUCING SAME

[75] Inventors: Tsutomu Takahashi; Tetsuya Matsukawa; Yoshihiro Naito; Akihiro Sato, all of Ichiharashi, Japan

[73] Assignee: Chisso Corporation, Osaka, Japan

[21] Appl. No.: 819,420

[22] Filed: Jan. 16, 1986

Related U.S. Application Data

[63] Continuation of Ser. No. 678,059, Dec. 4, 1984, abandoned.

[30] Foreign Application Priority Data

Dec. 23, 1983 [JP] Japan ................................ 58-243399

[51] Int. Cl.$^4$ .............................................. C08F 4/64
[52] U.S. Cl. .................................... 502/108; 502/120; 526/119; 526/138; 526/904
[58] Field of Search ................................ 502/108, 120

[56] References Cited

U.S. PATENT DOCUMENTS 3,317,502  5/1967  Harban et al. ...................... 526/138
4,235,747 11/1980  Leung ................................. 526/142
4,309,521  1/1982  Sato et al. .......................... 526/119
4,368,304  1/1983  Sato et al. .......................... 526/119
4,460,757  7/1984  Sato et al. .......................... 526/119

FOREIGN PATENT DOCUMENTS 55-31821  3/1980  Japan .

Primary Examiner—Edward J. Smith
Attorney, Agent, or Firm—Fred Philpitt

[57] ABSTRACT

A highly active catalyst for olefin polymerization, which is resistant to catalyst poisons contained in olefins as polymerization raw material and according to which the percentage of amorphous polymer formed is small, is provided, which catalyst is obtained by reacting a reaction product (I) of an organoaluminum compound with an electron donor, with TiCl$_4$, further reacting the resulting solid product (II) with an electron donor and an electron acceptor, mixing the resulting solid product (III) with an organoaluminum compound in an inert solvent, keeping the resulting catalyst dispersion at 0° to 70° C., and having a small amount of an α-olefin and an extremely small amount of carbonyl sulfide slowly absorbed in the dispersion kept as above, to thereby subject the dispersion to a preliminary polymerization.

6 Claims, No Drawings

CATALYST FOR OLEFIN POLYMERIZATION AND PROCESS FOR PRODUCING SAME

This is a continuation of application Ser. No. 678,059, filed Dec. 4, 1984, now abandoned, and the benefits of 35 USC 120 are claimed relative to it.

BACKGROUND OF THE INVENTION

1. Field of the Invention

This invention relates to a catalyst for olefin polymerization and a process for producing the same. More particularly it relates to a catalyst for olefin polymerization, obtained by subjecting a specified Ziegler-Natta highly active catalyst to a preliminary polymerization treatment with a small amount of an α-olefin and an extremely small amount of carbonyl sulfide, according to which catalyst the reduction in the polymerization activity due to poison impurities contained in α-olefin used is small and also the percentage of amorphous polymer byproduced is small, and also relates to a process for producing the catalyst.

2. Description of the Prior Art

In recent years, as there have been developed the so-called highly active catalysts i.e. Ziegler-Natta catalysts obtained by combining a catalyst component prepared by reducing $TiCl_4$ with a specified organoaluminum compound or the like, with an organoaluminum compound, the presence of a trace amount of poison substances to catalyst contained in α-olefin used has raised a serious problem even in the case of suspension polymerization carried out in an inert solvent.

Among these poison substances to catalyst, particularly carbonyl sulfide (COS), if present in 10 ppm or more in raw material α-olefins such as propylene, notably reduces the polymerization activity of highly active catalysts when used in suspension polymerization of propylene. Thus, in such a case, propylene has been purified to remove the catalyst poison substances. On the other hand, it has been known that if carbonyl sulfide is present in a trace amount (e.g. 1~10 ppm) in an α-olefin, the yield of crystalline polymer is improved in the above polymerization using the α-olefin (Japanese patent application laid-open No. Sho 55-31821/1980).

In view of the foregoing, the present inventors have made extensive research in order to find a catalyst for olefin polymerization which is not only not reduced in the polymerization activity even when exposed to carbonyl sulfide as a poison substance, but also can notably reduce the percentage of amorphous polymer byproduced, contrarily by effectively arranging carbonyl sulfide in the highly active catalyst component. As a result, we have found that in the case where a catalyst obtained by combining a specified, highly active catalyst component with an organoaluminum compound is subjected to a preliminary polymerization treatment with a small amount of an α-olefin, if an extremely small amount of carbonyl sulfide is used at the same time, it is possible to obtain a catalyst for olefin polymerization having the above-mentioned properties.

As apparent from the foregoing, an object of the present invention (having two aspects) is to provide a highly active catalyst for olefin polymerization, which is resistant to catalyst poisons contained in olefins as polymerization raw material, and according to which the percentage of amorphous polymer formed is small, and a process for producing the same. Another object of the present invention is to provide a process for olefin polymerization using the above catalyst.

SUMMARY OF THE INVENTION

The present invention consists of a first aspect having the following constitutions (1) to (7) and a second aspect having those (8) to (11):

(1) A catalyst for olefin polymerization obtained by reacting a reaction product (I) of an organoaluminum compound with an electron donor, with $TiCl_4$, further reacting the resulting solid product (II) with an electron donor and an electron acceptor, mixing the resulting solid product (III) with an organoaluminum compound in an inert solvent, keeping the resulting catalyst dispersion at a temperature in the range of 0° C. to 70° C., and having a small amount of an α-olefin and also an extremely small amount of carbonyl sulfide slowly absorbed in the catalyst dispersion kept as above, to thereby subject the catalyst dispersion to a preliminary polymerization treatment.

(2) A catalyst for olefin polymerization according to the above item (1) wherein carbonyl sulfide is in advance mixed with said α-olefin to be absorbed in said catalyst dispersion, and (1) the concentration of the carbonyl sulfide in said α-olefin is in the range of 500 ppm to 50,000 ppm and (2) the molar ratio of the carbonyl sulfide to $TiCl_3$ in said solid product (III) is in the range of 0.001 to 1.00.

(3) A catalyst for olefin polymerization according to the above item (1) wherein the amount of an α-olefin to be absorbed in said catalyst dispersion is in the range of 0.50 to 5.0 times by weight the amount of said solid product (III) in said dispersion.

(4) A catalyst for olefin polymerization according to the above item (2) wherein in advance of having a mixed gas of an α-olefin with carbonyl sulfide absorbed in said catalyst dispersion, an α-olefin in an amount in the range of 0.10 to 0.50 times by weight the amount of said solid product (III) in said dispersion is absorbed therein.

(5) A catalyst for olefin polymerization according to the above item (1) wherein the molar ratio of said organoaluminum compound to be combined with said solid product (III) to Ti in said solid product (III) is 2.0 or less.

(6) A catalyst for olefin polymerization according to the above item (1) wherein said α-olefin is selected from the group consisting of ethylene, propylene, butene-1, pentene-1 and hexene-1.

(7) A catalyst for olefin polymerization according to the above item (1) wherein a reaction product (I') of an organoaluminum compound with an electron donor is further added to said catalyst dispersion.

(8) A process for producing a catalyst for olefin polymerization which comprises reacting a reaction product (I) of an organoaluminum compound with an electron donor, with $TiCl_4$, further reacting the resulting solid product (II) with an electron donor and an electron acceptor, mixing the resulting solid product (III) with an organoaluminum compound in an inert solvent, keeping the resulting catalyst dispersion at a temperature in the range of 0° C. to 70° C. and having a small amount of an α-olefin and also an extremely small amount of carbonyl sulfide slowly absorbed in the catalyst dispersion kept as above, to thereby subject the catalyst dispersion to a prelimianry polymerization treatment.

(9) A process for producing a catalyst for olefin polymerization according to the above item (8) wherein after said preliminary polymerization treatment, an organoaluminum compound is further added so that the molar ratio of the organoaluminum compound to Ti in said solid product (III) in the resulting catalyst dispersion can be greater than 3.0.

(10) A process for producing a catalyst for olefin polymerization according to the above item (8) wherein a reaction product (I') of an organoaluminum compound with an electron donor is further added to said catalyst dispersion.

(11) A process for producing a catalyst for olefin polymerization according to the above item (10) wherein said reaction product (I') of an organoaluminum compound with an electron donor to be further added is a product obtained by reacting 0.1 to 8 mols of at least one compound selected from the group consisting of methyl p-toluylate, hexamethylphosphoric acid triamide, diphenyl ether, ethyl benzoate and ethyl anisate with 1.0 mol of an organoaluminum compound at a temperature in the range of 20° to 200° C. and for a time in the range of 30 seconds to 5 hours.

DETAILED DESCRIPTION OF THE PREFERRED EMBODIMENTS

The organoaluminum compounds used for preparing the highly active titanium trichloride catalyst component (solid product (III)) used in the present invention are expressed by the general formula $AlR_nR'_{n'}X_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number of $0 < n+n' \leq 3$, and concrete examples are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride, dibutylaluminum hydride; and alkylaluminum sesqui or dihalides such as methylaluminum sesquichloride, ethylaluminum sesquichloride, ethylaluminum dichloride, i-butylaluminum dichloride, etc. Besides, alkoxyalkylaluminums such as monoethoxydiethylaluminum, diethoxymonoethylaluminum, etc. may be also used.

The organoaluminum compounds for obtaining the reaction product (I), the organoaluminum compounds to be combined with the solid product (III) and used in the preliminary polymerization treatment and the polymerization reaction and the organoaluminum compounds to be added to the reaction system as a reaction product thereof with an electron donor may be the same as or different from each other.

As for the electron donors employed in the present invention, various kinds are illustrated below, but preferably ethers are mainly used and other electron donors are employed together with ethers. As for the electron donors employed, organic compounds containing at least one atom of oxygen, nitrogen, sulfur and phosphorus, such as ethers, alcohols, esters, aldehydes, fatty acids, ketones, nitriles, amines, amides, ureas, thioureas, isocyanates, azo compounds, phosphines, phosphites, phosphinites, thioethers, thioalcohols, etc. Concrete examples are ethers such as diethyl ether, di-n-propyl ether, di-n-butyl ether, di(isoamyl) ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran, and the like; alcohols such as methanol, ethanol, propanol, butanol, pentanol, hexanol, octanol, etc., phenoles such as phenol, cresol, xylenol, ethylphenol, naphthol and the like; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, succinic acid, acrylic acid, maleic acid and the like; aromatic acids such as benzoic acid and the like; ketones such as methyl ethyl ketone, methyl isobutyl ketone, benzophenone and the like; nitriles such as acetonitrile, butyronitrile, etc.; amines such as methylamine, diethylamine, tributylamine, triethanolamine, $\beta$(N,N-dimethylamino)ethanol, pyridine, quinoline, $\alpha$-picoline, N,N,N',N'-tetramethylhexaethylene diamine, aniline, dimethylaniline and the like; amides such as formamide, hexamethylphosphoric acid triamide, N,N,N',N',N''-pentamethyl-N'-$\beta$-dimethylaminomethylphosphoric acid triamide, octamethylpyrophosphoroamide and the like; ureas such as N,N,N',N'-tetramethylurea and the like; isocyanates such as phenylisocyanate, toluylisocyanate and the like; azocompounds such as azobenzene, azotoluene, and the like; phosphines such as ethylphosphine, triethylphosphine, tri-n-butylphosphine, tri-n-octylphosphine, triphenylphosphine, triphenylphosphine oxide and the like; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite and the like; thioethers such as diethyl thioether, diphenyl thioether, methyl phenyl thioether, ethylene sulfide, propylene sulfide and the like; and thioalcohols such as ethylthioalcohol, n-propylthioalcohol, thiophenol and the like. These electron donors may be used in admixture of two or more kinds in an optional proportion.

An organoaluminum compound (A₁) and an electron donor (B₁) are reacted as follows to obtain a reaction product (I) (wherein (A₁) and (B₁) refer to an organoaluminum compound and an electron donor used in the preparation of the reaction product (I), respectively):

This reaction is carried out in a solvent (D) at a temperature in the range of −20° C. to 200° C., preferably −10° C. to 100° C. for 30 seconds to 5 hours. The addition order of (A₁), (B₁) and (D) has no particular limitation, but the proportions of the amounts thereof used are suitably 0.1 to 8 mols, preferably 1 to 8 mols of the electron donor and 0.5 to 5 l of the solvent, each per mol of the organoaluminum compound. As the solvent, aliphatic hydrocarbons are preferable. Thus the reaction product (I) is obtained. This product may be subjected to the subsequent reaction without separating it, that is, in a liquid state after completion of the reaction, as it is (hereinafter the liquid being often referred to as reaction liquid (I)).

The reaction product (I) is then reacted with $TiCl_4$ to produce a solid product (II). The reaction of the reaction product (I) with $TiCl_4$ (C) is carried out at a temperature in the range of 0° to 100° C., preferably 10° to 70° C., for a time within 5 minutes to 5 hours. Non-use of the solvent is preferable, but aliphatic or aromatic hydrocarbons may be used. Mixing of (I), (C) and the solvent may be carried out in an optional order, and mixing of the total amounts is preferably completed within 3 hours. As to the respective amounts of these used in the reaction, the solvent is used in an amount of 0 to 3,000 ml per mol of $TiCl_4$, and the reaction product (I) is used in a ratio of the number of Al atoms in (I) to the number of Ti atoms in $TiCl_4$ (Al/Ti) of 0.05 to 10. After completion of the reaction, a liquid portion is separated and removed by filtering off or decantation, and then repeatedly washed with a solvent. The resulting solid product (II) may be used in the subsequent step in a state where it is suspended in a solvent, as it is, or may be further dried, taken out in the form of a solid product and used. For simplicity, the reaction liquid containing the solid product (II) after completion of the reaction of the reaction product (I) with $TiCl_4$ may be used as it is, in the subsequent step.

The solid product (II) is then reacted with an electron donor and an electron acceptor to prepare a solid product (III). The electron donor ($B_1$) used for obtaining the solid product (I), the electron donor ($B_2$) to be reacted with the solid product (II) and the electron donor ($B_3$) used for obtaining the solid product (I') may be respectively the same or different.

The electron acceptors (E) employed in the present invention are represented by halides of elements of Groups III to VI of the Periodic Table. Concrete examples are anhydrous aluminum chloride, $SiCl_4$, $SnCl_2$, $SnCl_4$, $TiCl_4$, $ZrCl_4$, $PCl_3$, $PCl_5$, $VCl_4$, $SbCl_5$, $I_2$, etc. $TiCl_4$ is most preferable. The reaction of the solid product (II) with an electron donor and an electron acceptor may be carried out without any solvent, but use of aliphatic hydrocarbons affords preferable results. The addition order of the solid product (II), electron donor, electron acceptor and solvent has no particular limitation. The amounts thereof used are 10 g to 1,000 g of electron donor, 10 g to 1,000 g of electron acceptor and 0 to 3,000 ml of solvent, each per 100 g of the solid product (II). These compounds may be preferably added at $-10°$ C. to 30° C. over 30 seconds to 60 minutes, and reacted at 30° C. to 200° C., preferably 50° C. to 100° C. for 30 seconds to 5 hours. After completion of the reaction, a liquid portion is separated and removed by filtering off or decantation and repeatedly washed with a solvent to obtain a solid product (III).

As the inert solvent used for the preliminary polymerization treatment of the present invention and the olefin polymerization reaction using the catalyst of the present invention, the following solvents are used:

As aliphatic hydrocarbons, n-heptane, n-octane, i-octane, etc. are exemplified. Further, in place of or together with aliphatic hydrocarbons, halogenated hydrocarbons may also be used such as carbon tetrachloride, chloroform, dichloroethane, trichloroethylene, tetrachloroethylene, etc. As aromatic compounds, aromatic hydrocarbons such as benzene, naphthalene and their derivatives such as alkyl substitutes e.g. mesitylene, durene, ethylbenzene, isopropylbenzene, 2-ethylnaphthalene, 1-phenylnaphthalene, halogenated compounds e.g. monochlorobenzene, α-dichlorobenzene, etc. are exemplified.

The preliminary polymerization reaction is carried out as follows:

First the solid product (III) and an organoaluminum compound in a definite molar ratio (as to the former, Ti content being calculated as the number of mols of $TiCl_3$) are combined by adding them to and mixing with a definite amount of an inert solvent. The molar ratio of an organoaluminum compound to the solid product has no particular limitation, but is preferably in the range of 0.01 to 2.0, most preferably 0.1 to 0.5. If it is less than 0.01, the effectiveness of the preliminary activation is liable to be unstable, while if it exceeds 2.0, the addition effectiveness of carbonyl sulfide of the present invention becomes unclear. The above mixing is carried out at 0° to 70° C., preferably 20° to 30° C. The ratios of (1) solid product (III)/inert solvent (by weight) and (2) organoaluminum compound/inert solvent (by weight) also have no particular limitation, but in order to smoothly carry out the preliminary polymerization treatment, both the ratios (1) and (2) are 0.1 or less, preferably 0.005 to 0.01.

The addition order of the solid product (III) and the aluminum compound to the inert solvent has no particular limitation, but the both may be added at the same time or after mixed in advance.

A small amount of an α-olefin and an extremely small amount of carbonyl sulfide are added to and absorbed in the mixture (catalyst dispersion) obtained above. The absorption temperature is 0° to 70° C. and the absorption time is 1 to 10 hours, preferably 2 to 4 hours. As for the α-olefin, ethylene, propylene, butene-1 or pentene-1 is easy to use. The amount of α-olefin used (amount to be absorbed) has no particular limitation, but it is preferably 0.50 to 1.00 times by weight the amount of the solid product (III) in the catalyst dispersion. If the amount of α-olefin absorbed is very small, the duplicativity of the property (poison-resistant property) of the resulting catalyst is unstable, while if the amount is very large, the absorption effectiveness of carbonyl sulfide as described later becomes unclear. The absorption of carbonyl sulfide is carried out at the same time with the absorption of α-olefin (preferably in admixture with α-olefin), and more preferably a part of α-olefin is in advance absorbed and the carbonyl sulfide and α-olefin are mixed in the form of a mixed gas. As a result of the absorption, a polymer is produced from α-olefin to form a coating on the surface of the solid product (III). The carbonyl sulfide absorption in the present invention is preferably carried out after absorbing a portion of α-olefin. The amount of carbonyl sulfide used is in the range of 0.01 to 1.00 in terms of a molar ratio thereof to the amount of $TiCl_3$ in the solid product (III). If it is outside the above range, it is difficult to obtain a catalyst having the objective properties. Further since the amount of carbonyl sulfide used is extremely small as described above, carbonyl sulfide is preferably diluted with an inert gas or an α-olefin and used. The concentration of carbonyl sulfide diluted has no particular limitation, but is preferably 500 ppm to 50,000 ppm. It is presumed that carbonyl sulfide absorped be coordinated with Ti compound in the solid product (III).

By the above absorption treatment, the catalyst of the present invention (a suspension in an inert solvent) is obtained.

The catalyst of the present invention obtained as above may be used, as it is, for olefin polymerization (suspension polymerization or bulk polymerization). However, preferably the above organoaluminum compound is further added to make the molar ratio (organoaluminum compound/Ti in solid product (III)) in the catalyst dispersion, 3.0 to 50, preferably 3.0 to 10. When the organoaluminum compound is further added as above, it is possible to keep the polymerization activity of the catalyst of the present invention on a high level and also stabilize it.

When a reaction product (I') obtained by reacting an organoaluminum compound with a specified electron donor under conditions mentioned below is further added in a small amount to the catalyst of the present invention, it is possible to further improve the properties of the catalyst (improvement in the polymer yield per unit weight of catalyst, improvement in the physical properties of said polymer, etc.). Among such electron donors, examples of those which are preferred are methyl p-toluylate, hexamethylphosphoric acid triamide, diphenyl ether, ethyl benzoate, ethyl anisate, etc. Either one or more of these electron donors are reacted with an organoaluminum compound in a molar ratio in the range of preferably 0.1 to 0.8 at 20° to 200° C. and for 30 seconds to 5 hours. Other detailed reaction conditions are the same as those in the case of preparation of the reaction product (I). The thus obtained reaction product (I') may be added to the catalyst of the present invention in advance of using the catalyst for olefin polymerization or may be added during olefin polymerization. The amount of the reaction product (I') added is 0.001 to 0.1, preferably 0.05 to 0.5 in terms of a molar ratio of electron donor/TiCl$_3$ in solid product (III), constituting the product (I').

The present invention will be described in more detail by way of Examples, Control examples and Comparative examples.

EXAMPLE 1

(Preparation of solid product (III))

In this Example, a solid product (III) was prepared in the same manner as described in Example 1 of Japanese patent application laid-open No. Sho 56-120712/1981, but on a scale of 100 times that in the above Example 1. The resulting solid product (III) was used in Control examples 1-9, Comparative examples 1-13 and Examples 2-27 described later.

n-Hexane (6 l), DEAC (diethylaluminum monochloride) (5.0 mols) and diisoamyl ether (12.0 mols) were mixed at 25° C. over one minute and reacted at the same temperature for 5 minutes to obtain a reaction liquid (I) (molar ratio of diisoamyl ether/DEAC: 2.4). TiCl$_4$ (40 mols) was placed in a nitrogen-purged reactor, followed by heating it to 35° C., dropwise adding thereto the total quantity of the above reaction liquid (I) over 30 minutes, keeping the mixture at the same temperature for 30 minutes, raising the temperature to 75° C., reacting it further for one hour, cooling down to room temperature, removing the supernatant and four times repeating a procedure of adding n-hexane (40 l) and removing the supernatant by decantation to obtain a solid product (II) (1,900 g). The total quantity of this product (II) was suspended in n-hexane (30 l), followed by adding to the suspension, diisoamyl ether (1,600 g) and TiCl$_4$ (3,500 g) at room temperature over one minute, reacting them at 65° C. for one hour, cooling down to room temperature (20° C.) after completion of the reaction, removing the supernatant by decantation, 5 times repeating a procedure of adding n-hexane (40 l), stirring for 10 minutes, still standing and removing the supernatant, and drying under reduced pressure to obtain a solid product (III) (1,700 g).

EXAMPLE 2

(1) Preliminary polymerization treatment with propylene monomer having carbonyl sulfide mixed therein A 1 l capacity glass vessel equipped with a magnetic stirrer was purged with nitrogen gas, and purified n-hexane (800 ml) was fed therein under nitrogen stream, followed by feeding the solid product (III) obtained in Example 1 (2.00 g in terms of TiCl$_3$) and DEAC (3.13 g) to prepare a catalyst dispersion. Thereafter, propylene monomer (2.00 g) containing carbonyl sulfide of a concentration of 1,000 ppm therein was blown and absorbed in the above catalyst dispersion kept at 30° C., over 4 hours.

(2) Polymerization reaction

A 3 l capacity stainless autoclave equipped with a magnetic stirrer was purged with nitrogen gas, and n-hexane (1,500 l) was fed therein under nitrogen stream, followed by adding the catalyst dispersion subjected to preliminary polymerization treatment with propylene monomer having carbonyl sulfide mixed therein (the amount of the dispersion: 40 ml, and it contained TiCl$_3$ (100 mg) and DEAC (156 mg)), further adding fresh DEAC (351 mg) (molar ratio of DEAC/solid product (III) in terms of TiCl$_3$: 6.5) and then hydrogen (150 Nml), raising the temperature up to 70° C., pressurizing propylene up to a pressure of 10 Kg/cm$^2$G, and carrying out polymerization for 2 hours while keeping the temperature, stopping propylene feed, pressurizing methanol (150 ml) into the vessel to inactivate the catalyst, releasing and separating unreacted propylene, and separating and recovering a polymer (polypropylene) and atactic polypropylene (App) from the polymerization suspension in a conventional manner. Polypropylene yield per g of TiCl$_3$ composition (ISO.C.Y.) was calculated based on the amount of polypropylene recovered. Further, the percentage of App formed was calculated from the amount of App formed according to the following equation (this also applies to the subsequent Examples, Control examples and Comparative examples):

Percentage of App formed (%) =

$$\frac{\text{Amount of App formed}}{\text{polypropylene yield + amount of App formed}} \times 100$$

EXAMPLES 3~6

(1) Preliminary polymerization treatment with propylene monomer having carbonyl sulfide mixed therein In Examples 3~5, the preliminary polymerization treatment with propylene monomer having carbonyl sulfide mixed therein was carried out as in Example 2 except that the concentration of carbonyl sulfide was varied (5,000 ppm in Example 3; 10,000 ppm in Example 4; and 50,000 ppm in Example 5). In Example 6, the preliminary polymerization treatment was carried out as in Example 4 except that the molar ratio of DEAC was varied.

(2) Polymerization reaction

This was carried out under all the same conditions and process as in Example 2, and the respective ISO.C.Y.s and percentages of App formed were calculated.

CONTROL EXAMPLES 1~4

These examples were carried out as in Examples 2~5 except that the preliminary polymerization was not carried out at all, and carbonyl sulfide was not added or added in the same amounts as in Examples 3~5 at the time of start of polymerization (Control examples 2~4).
(1) Preparation of catalyst solution A 1 l capacity glass vessel equipped with a magnetic stirrer was purged with nitrogen gas and purified n-hexane (800 ml) was fed therein under nitrogen gas stream, followed by feeding the solid product (III) (2.00 g in terms of TiCl$_3$) obtained in Example 1 and DEAC (3.13 g) to prepare a catalyst dispersion, which was then subjected only to agitation for 4 hours while the temperature was kept at 30° C.
(2) Polymerization reaction Polymerizations were carried out under all the same conditions and process as in Examples 3~6, using the catalyst dispersion obtained above in (1) except that carbonyl sulfide was added in definite amounts at the time of start of polymerization (Control example 1 [0]; Control example 2 [molar ratio of COS/solid product (III): 0.013]; Control example 3 [molar ratio COS/solid product (III): 0.026]; and Control example 4 [molar ratio of COS/solid product (III): 0.13]), and the respective ISO.C.Y.s and percentages of App formed were calculated.

COMPARATIVE EXAMPLES 1~4

(1) Preliminary polymerization treatment with propylene monomer alone

The catalyst dispersion was prepared in all the same manner as in Comparative examples and Examples and kept at 30° C., followed by blowing propylene monomer (containing no COS) (2.00 g) therein for 4 hours to have it absorbed therein.
(2) Polymerization reaction Using the catalyst dispersion obtained by the above preliminary polymerization treatment with propylene monomer alone, polymerization reactions were carried out under the same conditions and process as in Examples 3~6 except that carbonyl sulfide was added in definite amounts at the time of start of polymerization (Comparative example 1 [0]; Comparative example 2 [molar ratio of COS/solid product (III): 0.013]; Comparative example 3 [molar ratio of COS/solid product (III): 0.026]; and Comparative example 4 [molar ratio of COS/solid product (III): 0.13]), and the respective ISO.C.Y.s and percentages of App formed were calculated.

The results of the above Examples 2~6, Comparative examples 1~4 and Control examples 1~4 are shown in Table 1. As apparent from this Table, the difference in the addition manner of carbonyl sulfide (reaction process) results in the difference in the polymerization results.

When Examples 3~5, Comparative examples 2~4 and Control examples 2~4 are compared in the same molar ratio of COS/solid product (III), it is seen that Examples 3~5 afford the lowest percentages of App formed and hence are superior. In the case of the addition manners of Control examples 2~4, the effectiveness of App reduction is observed as compared with the case of Control example 1 (non-addition of COS), but as compared with the cases of Examples 3~5, not only small is the effectiveness of App reduction, but also the reduction in the activity (ISO.C.Y.) is too large (Control example 4 [ISO.C.Y.: 2,850, percentage of App formed: 0.60%]; Example 5 [ISO.C.Y.: 3,905, percentage of App formed: 0.42%); hence the addition manners of Control examples 2~4 are not practical. Next, in the cases of the addition manners of Comparative examples 2~4, the effectiveness of App reduction is larger than those of Comparative example 1 and Control examples, but the tendency of activity reduction is not different from those of Control examples 2~4 (Comparative example 4 [ISO.C.Y.: 2,907, percentage of App formed: 0.55%]); hence the addition manners are also not practical.

Whereas, in the cases of Examples 3~5, even when the molar ratio of COS (its amount added) is increased, the activity does not lower so much, and there are exhibited lower percentages of App formed than those of Control examples and Comparative examples. These facts clearly evidence that the preliminary polymerization treatment with propylene monomer having carbonyl sulfide mixed therein, of the present invention, exhibits a different effectiveness from that of conventional preliminary polymerization treatment with propylene, and also makes more effective the App reduction effectiveness with carbonyl sulfide. Example 2 (ISO.C.Y.: 4,165, percentage of App formed: 0.65%) also exhibits an effectiveness to the same extent as or larger than those in the cases of other addition manners in respect of carbonyl sulfide (Comparative example 2 and Control example 2), even in a molar ratio of COS/solid product (III) as low as 1/5; thus, it is seen that the Example exhibits the specific property of the App reduction effectiveness due to carbonyl sulfide of the present invention.

Next, Example 6 shows that even when the DEAC molar ratio in the preliminary polymerization treatment with propylene monomer having carbonyl sulfide mixed therein is low, there is no difference in the effectiveness.

CONTROL EXAMPLES 5~6, COMPARATIVE EXAMPLES 5~8 AND EXAMPLES 7~9

As to the difference in the addition manner of carbonyl sulfide (difference in the reaction manner of COS), the effectiveness was compared through long time polymerization (8 hours). The conditions and results are shown in Table 2.

In the cases of Examples 7~9, the activities are higher and the App reduction effectiveness is superior as compared with those in the corresponding Control examples and Comparative examples.

CONTROL EXAMPLES 7~8, COMPARATIVE EXAMPLES 9~12 AND EXAMPLES 11~14

As to the difference in the addition manner of carbonyl sulfide, the effectiveness was compared through high temperature polymerization (80° C.). The conditions and results are shown in Table 3.

In the cases of Examples 11~14, the activities were higher and the App reduction effectiveness was superior as compared with those in the corresponding Control examples and Comparative examples.

As described above, the effectiveness of the preliminary polymerization treatment with propylene monomer having carbonyl sulfide mixed therein is also observed in both the cases of long time polymerization and high temperature polymerization; this indicates that the present invention exhibits a different effectiveness from that in the case of conventional preliminary polymerization treatment with propylene alone, and makes more effective the App reduction effectiveness by means of carbonyl sulfide.

EXAMPLES 15~24

Next, the catalyst dispersion subjected to the preliminary polymerization treatment with propylene monomer having carbonyl sulfide mixed therein was preserved for a long time and thereafter used. Polymerization conditions and results are shown in Table 4.

Concretely, the catalyst dispersion prepared in Example 4 was kept at 25° C. in a 1 l glass vessel equipped with a stirrer, and the change in the catalyst performance with lapse of time was observed through the polymerization reaction with stirring (100 rpm). As a result, as shown in Example 15 (after allowing the dispersion to stand for 14 days, ISO.C.Y.: 3,930, percentage of App formed: 0.68%) and Example 16 (after allowing it to stand for 30 days, ISO.C.Y.: 3,970, percentage of App formed: 0.88%), the activity was unchanged, but there was a tendency that the percentage of App formed increased; thus it was presumed that catalyst deterioration with lapse of time occurred and the App reduction effectiveness with carbonyl sulfide was lost. Whereas, as compared with the catalyst dispersion of Example 6 wherein the molar ratio of DEAC was reduced from 2.0 down to 1.0 at the time of the preliminary polymerization treatment with propylene monomer having carbonyl sulfide mixed therein, the activity and the percentage of App formed were unchanged from those of Example 6, and no catalyst deterioration with lapse of time occurred, as shown in Example 17 (after allowing the dispersion to stand for 14 days, ISO.C.Y.: 3,904, percentage of App formed: 0.49%) and Example 18 (after allowing it to stand for 30 days, ISO.C.Y.: 3,960, percentage of App formed: 0.46%).

EXAMPLES 19~21

(two-stage preliminary polymerization treatment (1))

Before or after the preliminary polymerization treatment with propylene monomer having carbonyl sulfide mixed therein, the catalyst dispersion was subjected to a preliminary treatment with propylene monomer alone (a two-stage preliminary polymerization treatment). The polymerization conditions and results are shown in Table 4.

These Examples correspond to a case of the two-stage preliminary polymerization where propylene monomer was used at the first stage and propylene having carbonyl sulfide mixed therein, at the second stage.

A catalyst dispersion was prepared in a 1 l glass vessel equipped with a magnetic stirrer under the same conditions and manner as in Example 2. In the first-stage preliminary treatment, while the temperature was kept at 30° C., propylene monomer (containing no COS) (1.00 g) was blown and absorbed in the dispersion over 4 hours. Next in the second-stage preliminary treatment, while the dispersion was kept at 30° C., propylene monomer (2.00 g) containing 10,000 ppm of carbonyl sulfide as in Example 4 was blown and absorbed over 4 hours.

The resulting catalyst dispersion was kept in a glass vessel at 25° C. as in Examples 17 and 18 to observe the change in the catalyst performance with lapse of time through polymerization reaction. The activity and percentage of App formed were unchanged from those of Example 19 wherein polymerization was carried out just after the two-stage preliminary polymerization treatment (within 4 hours), and also no deterioration of the catalyst performance occurred, as shown in Example 20 (after allowing the dispersion to stand for 14 days, ISO.C.Y.: 3,942, percentage of App formed: 0.45%) and Example 21 (after allowing it to stand for 30 days, ISO.C.Y.: 3,944, percentage of App formed: 0.50%).

EXAMPLES 22~24

(two-stage preliminary polymerization treatment (2))

These Examples correspond to a case of the two-stage preliminary polymerization treatment where propylene having carbonyl sulfide mixed therein was used at the first stage and propylene monomer, at the second stage.

The catalyst dispersion was prepared as in Example 19. In the first-stage preliminary treatment, while the temperature was kept at 30° C., propylene monomer (2.00 g) containing 10,000 ppm of carbonyl sulfide as in Example 4 was blown and absorbed in the dispersion over 4 hours. Next in the second-stage preliminary treatment, while the dispersion was kept at 30° C., propylene monomer (containing no COS) (1.00 g) was blown and absorbed in the dispersion over 4 hours.

The catalyst dispersion subjected to the two-stage preliminary polymerization treatment was kept in a glass vessel at 25° C. as in Examples 20~21, to observe the change in the catalyst performance with lapse of time through polymerization reaction. The experimental conditions and results are shown in Table 4.

The activity was unchanged from those in Examples 15 and 16 but there was a tendency of increase in the percentage of App formed, as shown in Example 23 (after allowing the dispersion to stand for 14 days, ISO.C.Y.: 3,960, percentage of App formed: 0.71%) and Example 24 (after allowing it to stand for 30 days, ISO.C.Y.: 3,911, percentage of App formed: 0.85%); thus it was presumed that catalyst deterioration with lapse of time occurred and the effectiveness of App reduction by means of carbonyl sulfide was lost.

From the foregoing it is seen that for preventing the change in the performance with lapse of time, of catalyst subjected to the preliminary polymerization treatment with propylene monomer having carbonyl sulfide mixed therein, reduction in the molar ratio of DEAC in the preliminary polymerization treatment and a two-stage preliminary polymerization treatment (practice of a preliminary polymerization treatment with propylene in advance of the preliminary polymerization treatment with propylene monomer having carbonyl sulfide mixed therein) are effective means.

CONTROL EXAMPLE 9

Control example 3 was repeated except that at the time of start of polymerization, an equimolecular reaction product of MPT (methyl p-toluylate) with DEAC was added in a molar ratio of MPT/solid product (III) of 0.01, to obtain results of (ISO.C.Y.: 4,010, percentage of App formed: 0.80%), which are shown in Table 5.

COMPARATIVE EXAMPLE 13

Comparative example 3 was repeated except that at the time of start of polymerization, an equimolecular reaction product of MPT with DEAC was added in a molar ratio of MTP/solid product (III) of 0.01, to obtain results of (ISO.C.Y.: 4,050, percentage of App formed: 0.57%), which are shown in Table 5.

EXAMPLES 25~27

Examples 4, 6 and 19 were repeated except that at the time of start of polymerization, an equimolecular reaction product of MPT with DEAC was added in a molar ratio of MPT/solid product (III) of 0.01, to obtain results of (ISO.C.Y.: 4,380, percentage of App formed: 0.28%) in Example 25, (ISO.C.Y.: 4,360, percentage of App formed: 0.26%) in Example 26 and (ISO.C.Y.: 4,410, percentage of App formed: 0.28%) in Example 27, which are shown in Table 5.

From the foregoing, it is seen that the preliminary polymerization treatment with propylene monomer having carbonyl sulfide mixed therein affords superior results in both the activity and the effectiveness of App reduction to those in Control examples and Comparative examples, and the treatment is also effective even when an electron donor (MPT) is at the same time used as a third component for catalyst.

TABLE 1

Difference in effectiveness according to COS addition process (1)

Preliminary polymerization step

| | Solid product (III) g | DEAC Mol ratio | Reaction temp. °C. | Treating time hr. | Amount of $C_3^=$ reacted, $C_3^=$/solid product (III) g/g | $COS/C_3^=$ conc. ppm. | Mol ratio of COS/solid product (III) |
|---|---|---|---|---|---|---|---|
| Control ex. | | | | | | | |
| 1 | 2.0 | 2.0 | 30 | 4 | — | — | — |
| 2 | " | " | " | " | — | — | — |
| 3 | " | " | " | " | — | — | — |
| 4 | " | " | " | " | — | — | — |
| Compar. ex. | | | | | | | |
| 1 | 2.0 | 2.0 | 30 | 4 | 1.0 | 0 | 0 |
| 2 | " | " | " | " | " | 0 | 0 |
| 3 | " | " | " | " | " | 0 | 0 |
| 4 | " | " | " | " | " | 0 | 0 |
| Example | | | | | | | |
| 2 | 2.0 | 2.0 | 30 | 4 | 1.0 | 1000 | 0.0026 |
| 3 | " | 2.0 | " | " | " | 5000 | 0.013 |
| 4 | " | 2.0 | " | " | " | 10000 | 0.026 |
| 5 | " | 2.0 | " | " | " | 50000 | 0.13 |
| 6 | " | 0.1 | " | " | " | 10000 | 0.026 |

Regular polymerization conditions

| | Solid product (III) mg | DEAC Mol ratio | Mol ratio of COS/solid product (III) | Polymerization temp. °C. | Polymerization time hr. | Polymerization results ISO. C.Y. g/g | % of App formed |
|---|---|---|---|---|---|---|---|
| Control ex. | | | | | | | |
| 1 | 100 | 6.5 | 0 | 70 | 2 | 4110 | 1.15 |
| 2 | " | " | 0.013 | " | " | 3800 | 0.96 |
| 3 | " | " | 0.026 | " | " | 3650 | 0.71 |
| 4 | " | " | 0.13 | " | " | 2850 | 0.60 |
| Compar. ex. | | | | | | | |
| 1 | 100 | 6.5 | 0 | 70 | 2 | 4130 | 0.87 |
| 2 | " | " | 0.013 | " | " | 3710 | 0.70 |
| 3 | " | " | 0.026 | " | " | 3605 | 0.67 |
| 4 | " | " | 0.13 | " | " | 2907 | 0.55 |
| Example | | | | | | | |
| 2 | 100 | 6.5 | *0.0026 | 70 | 2 | 4165 | 0.65 |
| 3 | " | " | *0.013 | " | " | 4015 | 0.51 |
| 4 | " | " | *0.026 | " | " | 3950 | 0.47 |
| 5 | " | " | *0.13 | " | " | 3905 | 0.42 |
| 6 | " | " | *0.026 | " | " | 3916 | 0.45 |

Note:
*No COS was added at the time of polymerization; hence, COS mol ratio at the time of preliminary polymerization.

TABLE 2

Difference in effectiveness according to COS addition process (2)
(Polymerization time - dependency is good.)

Preliminary polymerization step

| | Solid product (III) | DEAC Mol | Reaction temp. | Treating time | Amount of $C_3^=$ reacted, $C_3^=$/solid product (III) | $COS/C_3^=$ conc. | Mol ratio of |
|---|---|---|---|---|---|---|---|

TABLE 2-continued

Difference in effectiveness according to
COS addition process (2)
(Polymerization time - dependency is good.)

| | g | ratio | °C. | hr. | g/g | ppm | COS/solid product (III) |
|---|---|---|---|---|---|---|---|
| Control ex. | | | | | | | |
| 5 | | | | | — | — | — |
| 6 | | | | | — | — | — |
| Compar. ex. | | | | | | | |
| 5 | 2.0 | 2.0 | 30 | 4 | 1.0 | 0 | 0 |
| 6 | " | " | " | " | " | 0 | 0 |
| 7 | " | " | " | " | " | 0 | 0 |
| 8 | " | " | " | " | " | 0 | 0 |
| Example | | | | | | | |
| 7 | 2.0 | 2.0 | 30 | 4 | 1.0 | 1000 | 0.0026 |
| 8 | " | " | " | " | " | 5000 | 0.013 |
| 9 | " | " | " | " | " | 10000 | 0.026 |
| 10 | " | " | " | " | " | 50000 | 0.13 |

| | Regular polymerization conditions | | | | | Polymerization results | |
|---|---|---|---|---|---|---|---|
| | Solid product (III) mg | DEAC Mol ratio | Mol ratio of COS/solid product (III) | Polymerization temp. °C. | Polymerization time hr. | ISO C.Y. g/g | % of App formed |
| Control ex. | | | | | | | |
| 5 | 40 | 16 | 0 | 70 | 8 | 11350 | 2.16 |
| 6 | " | " | 0.026 | " | " | 9850 | 1.63 |
| Compar. ex. | | | | | | | |
| 5 | 40 | 16 | 0 | 70 | 8 | 11800 | 1.68 |
| 6 | " | " | 0.013 | " | " | 10610 | 1.46 |
| 7 | " | " | 0.026 | " | " | 10315 | 1.30 |
| 8 | " | " | 0.13 | " | " | 8314 | 1.14 |
| Example | | | | | | | |
| 7 | 40 | 16 | *0.0026 | 70 | 8 | 11650 | 1.25 |
| 8 | " | " | *0.013 | " | " | 11353 | 0.98 |
| 9 | " | " | *0.026 | " | " | 11100 | 0.92 |
| 10 | " | " | *0.13 | " | " | 11042 | 0.85 |

Control examples 5~6: No preliminary polymerization with $C_3^=$ was conducted; COS was added at the time of start of regular polymerization (Control ex. 5; COS: none).
Comparative examples 5~8: Preliminary polymerization with $C_3^=$ was conducted; COS was added at the time of start of regular polymerization (Comparative example 5; COS: none).
Examples 7~10: Preliminary polymerization with COS/$C_3^=$ mixed gas was conducted; no COS was added at the time of regular polymerization (*: mol ratio of COS added at the time of preliminary polymerization).

TABLE 3

Difference in effectiveness according to
COS addition process (3)
(suitability of high temperature polymerization)

| | Preliminary polymerization step | | | | | | |
|---|---|---|---|---|---|---|---|
| | Solid product (III) g | DEAC Mol ratio | Reaction temp. °C. | Treating time hr. | Amount $C_3^=$ reacted, $C_3^=$/solid product (III) g/g | COS/$C_3^=$ conc. ppm | Mol ratio of COS/solid product (III) |
| Control ex. | | | | | | | |
| 7 | 2.0 | 2.0 | 30 | 4 | — | — | — |
| 8 | " | " | " | " | — | — | — |
| Compar. ex. | | | | | | | |
| 9 | 2.0 | 2.0 | 30 | 4 | 1.0 | 0 | 0 |
| 10 | " | " | " | " | " | 0 | 0 |
| 11 | " | " | " | " | " | 0 | 0 |
| 12 | " | " | " | " | " | 0 | 0 |
| Example | | | | | | | |
| 11 | 2.0 | 2.0 | 30 | 4 | 1.0 | 1000 | 0.0026 |
| 12 | " | " | " | " | " | 5000 | 0.013 |
| 13 | " | " | " | " | " | 10000 | 0.026 |
| 14 | " | " | " | " | " | 50000 | 0.13 |

| | Regular polymerization conditions | | | | | Polymerization results | | |
|---|---|---|---|---|---|---|---|---|
| | Solid product (III) | DEAC Mol | Mol ratio of | Polymerization temp. | Polymerization time | ISO. C.Y. | % of App | B.D. |

TABLE 3-continued

Difference in effectiveness according to COS addition process (3)
(suitability of high temperature polymerization)

| | mg | ratio | COS/solid product (III) | °C. | hr. | g/g | formed | g/ml |
|---|---|---|---|---|---|---|---|---|
| Control ex. | | | | | | | | |
| 7 | 100 | 6.5 | 0 | 80 | 2 | 2980 | 3.10 | 0.20 |
| 8 | " | " | 0.026 | " | " | 2830 | 2.95 | 0.19 |
| Compar. ex. | | | | | | | | |
| 9 | 100 | 6.5 | 0 | 80 | 2 | 4956 | 2.33 | 0.49 |
| 10 | " | " | 0.013 | " | " | 4450 | 1.88 | 0.50 |
| 11 | " | " | 0.026 | " | " | 4320 | 1.80 | 0.50 |
| 12 | " | " | 0.13 | " | " | 3488 | 1.46 | 0.47 |
| Example | | | | | | | | |
| 11 | 100 | 6.5 | *0.0026 | 80 | 2 | 4990 | 1.45 | 0.50 |
| 12 | " | " | *0.013 | " | " | 4818 | 1.01 | 0.51 |
| 13 | " | " | *0.026 | " | " | 4710 | 0.90 | 0.51 |
| 14 | " | " | *0.13 | " | " | 4699 | 0.91 | 0.51 |

Control examples 7~8: No preliminary polymerization with $C_3^=$ was conducted; COS was added at the time of start of regular polymerization (Control ex. 7; COS: none).
Comparative examples 9~12: Preliminary polymerization with $C_3^=$ was conducted; COS was added at the time of start of regular polymerization (Comparative example 9; COS: none).
Examples 11~14: Preliminary polymerization with COS/$C_3^=$ mixed gas was conducted; no COS was added at the time of regular polymerization (*: mol ratio of COS added at the time of preliminary polymerization).

TABLE 4

Deterioration with lapse of time of catalyst solution treated with COS/$C_3^=$ mixture; two-stage preliminary polymerization treatment; and effect of mol ratio of DEAC

| | Preliminary polymerization step | | | | | | | Time during which catalyst solution subjected to preliminary polymerization with COS/$C_3^=$ mixture was allowed to stand (day) |
|---|---|---|---|---|---|---|---|---|
| | Solid product (III) g | DEAC Mol ratio | Reaction temp. °C. | Treating time hr. | Amount of $C_3^=$ reacted, $C_3^=$/solid product (III) g/g | COS/$C_3^=$ conc. ppm. | Mol ratio of COS/solid product (III) | |
| Example | | | | | | | | |
| 4 | 2.0 | 2.0 | 30 | 4 | 1.0 | 10000 | 0.026 | 0 |
| 15 | " | " | " | " | " | " | " | 14 |
| 16 | " | " | " | " | " | " | " | 30 |
| Example | | | | | | | | |
| 6 | 2.0 | 1.0 | 30 | 4 | 1.0 | 10000 | 0.026 | 0 |
| 17 | " | " | " | " | " | " | " | 14 |
| 18 | " | " | " | " | " | " | " | 30 |
| *Example | | | | | | | | |
| 19 | 2.0 | 2.0 | 30 | 4 | 1.0 | 10000 | 0.026 | 0 |
| 20 | " | " | " | " | " | " | " | 14 |
| 21 | " | " | " | " | " | " | " | 30 |
| **Example | | | | | | | | |
| 22 | 2.0 | 2.0 | 30 | 4 | 1.0 | 10000 | 0.026 | 0 |
| 23 | " | " | " | " | " | " | " | 14 |
| 24 | " | " | " | " | " | " | " | 30 |

| | Regular polymerization conditions | | | | Polymerization results | |
|---|---|---|---|---|---|---|
| | Solid product (III) mg | DEAC Mol ratio | Polymerization temperature °C. | Polymerization time hr. | ISO.C.Y. g/g | % of App formed |
| Example | | | | | | |
| 4 | 100 | 6.5 | 70 | 2 | 3950 | 0.47 |
| 15 | " | " | " | " | 3930 | 0.68 |
| 16 | " | " | " | " | 3970 | 0.88 |
| Example | | | | | | |
| 6 | 100 | 6.5 | 70 | 2 | 3916 | 0.45 |
| 17 | " | " | " | " | 3904 | 0.49 |
| 18 | " | " | " | " | 3960 | 0.46 |
| *Example | | | | | | |
| 19 | 100 | 6.5 | 70 | 2 | 3995 | 0.50 |
| 20 | " | " | " | " | 3942 | 0.45 |
| 21 | " | " | " | " | 3944 | 0.50 |
| **Example | | | | | | |
| 22 | 100 | 6.5 | 70 | 2 | 3915 | 0.49 |
| 23 | " | " | " | " | 3960 | 0.71 |

TABLE 4-continued

Deterioration with lapse of time of catalyst solution
treated with COS/C$_3$= mixture; two-stage preliminary
polymerization treatment; and effect of mol ratio of DEAC

| 24 | " | " | " | " | 3911 | 0.85 |

Examples 19~21: *two-stage preliminary polymerization treatment (1); preliminary treatment with C$_3$= alone was conducted in advance of preliminary treatment step with COS/C$_3$= gas mixture.
Examples 22~24: **two-stage preliminary polymerization treatment (2); preliminary treatment with C$_3$= alone was conducted after preliminary treatment step with COS/C$_3$= gas mixture.

TABLE 5

Effect of simultaneous use of a third component as catalyst

| | Preliminary polymerization step | | | | | | |
|---|---|---|---|---|---|---|---|
| | Solid product (III) g | DEAC Mol ratio | Reaction temp. °C. | Treating time hr. | Amount C$_3$= reacted, C$_3$=/solid product (III) g/g | COS/C$_3$= conc. ppm | Mol ratio of COS/solid product (III) |
| Control ex. | | | | | | | |
| 9 | 2.0 | 2.0 | 30 | 4 | — | — | — |
| Compar. ex. | | | | | | | |
| 13 | 2.0 | 2.0 | 30 | 4 | 1.0 | 0 | 0 |
| Example | | | | | | | |
| 25 | 2.0 | 2.0 | 30 | 4 | 1.0 | 10000 | 0.026 |
| 26 | " | 0.1 | " | " | " | " | " |
| *27 | " | 2.0 | " | " | " | " | " |

| | Regular polymerization conditions | | | | | Polymerization results | |
|---|---|---|---|---|---|---|---|
| | Solid product (III) mg | DEAC Mol ratio | Mol ratio of MPT/solid product (III) | Mol ratio of COS/solid product (III) | Polymerization temp. °C. | Polymerization time hr. | ISO.C.Y. g/g | % of App formed |
| Control ex. | | | | | | | | |
| 9 | 100 | 6.5 | 0.01 | 0.026 | 70 | 2 | 4010 | 0.80 |
| Compar. ex. | | | | | | | | |
| 13 | 100 | 6.5 | 0.01 | 0.026 | 70 | 2 | 4050 | 0.57 |
| Example | | | | | | | | |
| 25 | 100 | 6.5 | 0.01 | 0.026 | 70 | 2 | 4380 | 0.28 |
| 26 | " | " | 0.01 | " | " | " | 4360 | 0.26 |
| 27 | " | " | 0.01 | " | " | " | 4410 | 0.28 |

Control example 9: No preliminary polymerization with C$_3$= was conducted: COS and MPT were added at the time of start of regular polymerization.
Comparative example 13: Preliminary polymerization with C$_3$= alone was conducted; COS and MPT were added at the time of start of regular polymerization.
Examples 25~26: Preliminary polymerization with COS/C$_3$= gas mixture was conducted; MPT was added at the time of start of regular polymerization.
Example 27: *Two-stage preliminary polymerization treatment; preliminary treatment with C$_3$= alone was conducted in advance of preliminary polymerization step with COS/C$_3$= gas mixture (same as Example 19).

What we claim is:

1. A process for producing an olefin polymerization catalyst that comprises the steps of
   (a) reacting a reaction product (I) of an organoaluminum compound with an electron donor in a molar ratio of Al/Ti of 0.05 to 10, with TiCl$_4$, said organoaluminum compound having the general formula of AlRnR'n'X$_{3-(n+n')}$ wherein R and R' each represent a member selected from the group consisting of an alkyl group, an aryl group, an alkaryl group, a cycloalkyl group or an alkoxy group; X represents a fluorine, chlorine, bromine or iodine atom; and n and n' each represent an optional number of o<n+n'≦3;
   (b) further reacting the resulting solid product (II) with an ether and TiCl$_4$ in a quantity of 10 to 1,000 g/100 g of the solid product (II),
   (c) mixing the resulting solid product (III) with an organoaluminum compound in an inert solvent,
   (d) keeping the resulting catalyst dispersion at a temperature in the range of 0° C. to 70° C., and
   (e) preliminarily polymerizing the catalyst dispersion of step (d) by contacting it with an alpha-olefin and carbonyl sulfide so that the catalyst dispersion absorbs alpha-olefin and carbonyl sulfide
   (1) said carbonyl sulfide being mixed with said alpha-olefin that is to be absorbed in an amount within the range of 500 ppm to 50,000 ppm,
   (2) the amount of said alpha-olefin to be absorbed in said catalyst dispersion being in the range of 0.5 to 5.0 times by weight of the solid product (III) in the dispersion, and
   (3) the molar ratio of the carbonyl sulfide to the TiCl$_3$ in the solid product (III) being in the range of 0.001 to 1.00.

2. A process according to claim 1 wherein the molar ratio of said organoaluminum compound to be combined with said solid product (III) to Ti in said solid product (III) is 2.0 or less.

3. An olefin polymerization catalyst obtained by
   (a) reacting a reaction product (I) of an organoaluminum compound with an electron donor in a molar ratio of Al/Ti of 0.05 to 10, with TiCl$_4$, said organoaluminum compound having the general formula of AlRnR'n'X$_{3-(n+n')}$ wherein R and R' each represent a member selected from the group consisting of an alkyl group, an aryl group, an alkaryl group, a cycloalkyl group or an alkoxy group; X represents a fluroine, chlorine, bromine or iodine atom; and n and n' each represent an optional number of $o < n+n' \leq 3$, (b) further acting the resulting solid product (II) with an ether and $TiCl_4$ in a quantity of 10 to 1000 g/100 g of the solid product (II), (c) mixing the resulting solid product (III) with an organoaluminum compound in an inert solvent, (d) keeping the resulting catalyst dispersion at a temperature in the range of 0° to 70° C., and (e) preliminarily polymerizing the catalyst dispersion of step (d) by contacting it with an alpha-olefin and carbonyl sulfide so that the catalyst dispersion absorbs alpha-olefin and carbonyl sulfide (1) said carbonyl sulfide being mixed with said alpha-olefin that is to be absorbed in an amount within the range of 500 ppm to 50,000 ppm, (2) the amount of said alpha-olefin to be absorbed in said catalyst dispersion being in the range of 0.5 to 5.0 times by weight of the solid product (III) in the dispersion, and (3) the molar ratio of the carbonyl sulfide to the $TiCl_3$ in the solid product (III) being in the range of 0.001 to 1.00.

4. A catalyst according to claim 3 wherein the molar ratio of said organoaluminum compound to be combined with said solid product (III) to Ti in said solid product (III) is 2.0 or less.

5. A catalyst according to claim 3 wherein said alpha-olefin is selected from the group consisting of ethylene, propylene, butene-1, pentene-1 and hexene-1.

6. A catalyst according to claim 3 wherein a reaction product (I') of an organoaluminum compound with an electron donor is further added to said catalyst dispersion.

* * * * *